Patented Nov. 23, 1943

2,334,987

UNITED STATES PATENT OFFICE 2,334,987

METHOD OF HYDROLYZING PROTEINS

Frederick C. Bersworth, Verona, N. J., assignor to The Martin Dennis Company, Newark, N. J., a corporation of New Jersey No Drawing. Application October 24, 1940, Serial No. 362,614

6 Claims. (Cl. 260—529)

This invention relates to chemistry and more particularly to organic chemistry and has for its object the provision of an improved method of hydrolyzing protein to amino acids. Another object is to provide a method of converting protein to substituted amino acid compounds. Still another object is to provide a method for producing substituted amino acid compounds of a type not heretofore known in the art. Other objects and advantages will be apparent as the invention is more fully hereinafter disclosed.

In copending application Serial No. 362,613, filed October 24, 1940, entitled "Method of hydrolyzing organic compounds," I have described and claimed a method of converting protein into amino acids in which the hydrolysis reaction is carried out under a substantially constant oxidation-reduction potential. In accordance with the method disclosed the protein is suspended in a caustic alkali solution and an oxidation-reduction stabilizer consisting of oxidizable and reducible material (lead and lead oxide) is added to the suspension before heating the suspension to within the temperature range 140–200° C. for the time interval required to obtain substantially complete hydrolysis of the protein to amino acids. The presence of the said oxidation-reduction stabilizer materially reduces the losses incident to oxidation and reduction reactions involving the protein, amino acids and intermediate hydrolyzed products and facilitates the conversion of the protein to amino acids on a large scale production basis with consistently uniform results.

I have discovered that an organic alkali, such as an amine, may be substituted in part or in whole for the inorganic alkali utilized in hydrolyzing protein to amino acids in accordance with the disclosure of my said copending application and that in the presence of such an organic alkali various basic substituted amino acid compounds may be produced, many of which appear to be entirely new in the art.

In accordance with this discovery, an amine, such as ethylene diamine, is substituted in part or in whole for the caustic alkali, in substantially stoichemetrical equivalency for the caustic alkali, preferably in such total amount as will provide at least sufficient organic alkali to react substantially completely with the amino acids formed by hydrolysis of the protein and sufficient caustic alkali to provide the excess alkali required to promote an economically practical rate of hydrolysis.

In accordance with the specific embodiment given in the said copending application 100 grams protein (for example soy bean meal) is mixed with 160 grams of caustic alkali solution (50% caustic alkali) and 5 to 15 grams of oxidation-reduction stabilizer material (for example lead and lead oxide) is added thereto and the suspension is diluted to 1000 cubic centimeter volume (one liter) with water. This suspension then is heated to a temperature within the range 140–200° C. preferably in an autoclave or similar container sealed from the atmosphere for a time interval at least sufficient to obtain substantially complete hydrolysis of the protein into amino acids.

In accordance with the present invention, an organic alkali, for example an amine such as ethylene diamine, is substituted in part or in whole for the inorganic alkali in the specific embodiment given above, but preferably in total amount approximating 60 grams, at least sufficient to react substantially completely with the amino acids produced by hydrolysis to produce basic substituted amino acid compounds therewith but not in an amount sufficient to completely replace the caustic alkali.

I have found that the presence of some inorganic alkali beneficially effects the rate of hydrolysis of the protein and also the losses of amino acids incident to oxidation and reduction reactions, particularly when the oxidation-reduction stabilizer agent is comprised of lead and lead oxide which is preferred. This is due, it is believed, to the solubilizing effect of the caustic alkali towards lead oxide and possibly the greater reactivity of ionized alkali plumbate towards the intermediate hydrolysis products and deleterious impurities, such as sulfur, normally present in the protein being hydrolyzed.

It is believed apparent that with any given protein being hydrolyzed the extent of substitution of organic alkali for inorganic alkali may be varied widely without essential departure from the present invention, to obtain either partial conversion of the amino acids formed into substituted amino acids or total conversion of the same. It is also believed apparent that the substitution of sugar beet residues, albumen, casein, and the like protein materials may require the use of different relative proportions of protein to alkali and of stabilizer agent than specified above and that such variations may be made without essential departure from the specific embodiment given.

The basic substituted amino acid compounds produced in accordance with the present invention may be recovered from solution by methods heretofore known in the art.

An organic alkali within the scope of the present invention comprises any amine or mixture of amines. A protein within the scope of the present invention comprises any identified as an anhydride of amino acids and subject to conversion by hydrolysis in part or in whole to amino acids.

Having hereinabove described the present invention generically and specifically and given one specific embodiment of the practice of the same, it is believed apparent that many modifications and departures may be made therein without essential departure therefrom and all such are contemplated as may fall within the scope of the following claims:

What I claim is:

1. The method of converting the amino acid anhydride content of naturally occurring protein materials into substituted amino compounds which comprises suspending the said protein material in an aqueous solution containing caustic alkali and an amine, incorporating therein a proportion of an oxidation-reduction stabilizing agent consisting of lead and lead oxide, and heating the said suspension in a container sealed from the atmosphere to a temperature within the range 140–200° C. for an extended time interval.

2. The method of converting the amino acid anhydride content of naturally occurring protein materials of the group consisting of soy bean meal, sugar beet residues, albumen and casein, into substituted amino compounds which comprises suspending the protein material in an aqueous solution containing a caustic alkali and an amine, the amount of said amine being approximately sufficient to react substantially completely with the amino acid content of the said protein material, incorporating therein a proportion of an oxidation-reduction stabilizing agent consisting of lead and lead oxide, and then heating the mixture of materials in a container sealed from the atmosphere to a temperature within the range 140–200° C. for an extended time interval at least sufficient to obtain substantially complete hydrolysis of the amino acid anhydride present to amino acids by the caustic alkali present in the solution and the reaction of said amino acid with the amine present in said solution to form said substituted amino compounds.

3. The method of converting the amino acid anhydride content of soy bean meal into substituted amino acid compounds which comprises hydrolyzing the said soy bean meal in an alkaline solution in the present of an oxidation-reduction potential stabilizing agent consisting of a mixture of lead and lead oxide and in the presence of an amine.

4. The method of converting the amino acid anhydride content of soy bean meal into substituted amino acid compounds which comprises suspending the soy bean meal in an aqueous solution containing caustic alkali and an amine and a proportion of an oxidation-reduction potential stabilizing agent consisting of a mixture of lead and lead oxide, and heating the said suspension in a container sealed from the atmosphere to a temperature within the range 140–200° C. for an extended time interval.

5. The method of converting the amino acid anhydride content of soy bean meal into substituted amino acid compounds which comprises suspending the soy bean meal in an aqueous solution containing a caustic alkali and ethylene diamine and a proportion of an oxidation-reduction stabilizing agent consisting of a mixture of lead and lead oxide, and heating the said suspension in a container sealed from the atmosphere to a temperature within the range 140–200° C. for an extended time interval.

6. The method of converting the amino acid anhydride content of soy bean meal into substituted amino acid compounds which comprises suspending the soy bean meal in an aqueous solution containing a caustic alkali and ethylene diamine and a proportion of an oxidation-reduction stabilizing agent consisting of a mixture of lead and lead oxide, the relative amounts of materials forming the suspension comprising 60 grams of ethylene diamine, 100 grams caustic alkali, and 5 to 15 grams of a mixture of lead and lead oxide to each 100 grams of said soy bean meal suspended in a volume of water approximating one liter, and heating the said suspension in a container sealed from the atmosphere to a temperature within the range 140–200° C. for an extended time interval.

FREDERICK C. BERSWORTH.